(12) United States Patent
Sullivan (10) Patent No.: US 8,073,399 B2
(45) Date of Patent: Dec. 6, 2011

(54) DEVICE AND METHOD FOR MATRIXED ADAPTIVE EQUALIZING FOR COMMUNICATION RECEIVERS CONFIGURED TO AN ANTENNA ARRAY

(75) Inventor: Timothy P. Sullivan, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 389 days.

(21) Appl. No.: 12/490,065

(22) Filed: Jun. 23, 2009

(65) Prior Publication Data

US 2010/0323653 A1  Dec. 23, 2010

(51) Int. Cl.
  *H04B 1/44* (2006.01)
  *H04K 3/00* (2006.01)
(52) U.S. Cl. ............... 455/78; 455/295; 455/296
(58) Field of Classification Search .......... 455/63.1, 455/67.13, 78, 295, 296; 375/346
  See application file for complete search history.

(56) References Cited

U.S. PATENT DOCUMENTS

| | | | |
|---|---|---|---|
| 3,699,444 A * | 10/1972 | Ghose et al. .......... | 455/79 |
| 4,670,885 A | 6/1987 | Parl et al. | |
| 4,952,193 A * | 8/1990 | Talwar .......... | 455/63.1 |
| 5,566,209 A | 10/1996 | Forssén et al. | |
| 5,574,509 A | 11/1996 | Citta et al. | |
| 5,646,942 A | 7/1997 | Oliver et al. | |
| 5,940,028 A | 8/1999 | Iwamura | |
| 6,023,625 A | 2/2000 | Myers, Jr. | |
| 6,216,244 B1 | 4/2001 | Myers et al. | |
| 6,229,480 B1 | 5/2001 | Shintani | |
| 6,314,304 B1 | 11/2001 | Uesugi | |
| 6,459,909 B1 | 10/2002 | Bilcliff et al. | |
| 6,509,934 B1 | 1/2003 | Bao et al. | |
| 6,650,702 B1 | 11/2003 | Steele | |
| 6,650,910 B1 | 11/2003 | Mazur et al. | |
| 6,771,318 B1 | 8/2004 | Ninomiya | |
| 6,867,819 B2 | 3/2005 | Lee | |
| 6,917,597 B1 | 7/2005 | Schmidl et al. | |
| 6,950,477 B2 | 9/2005 | Meehan et al. | |
| 7,015,948 B2 | 3/2006 | Skalina | |
| 7,057,573 B2 | 6/2006 | Ohira | |
| 7,133,477 B2 | 11/2006 | Yellin et al. | |
| 7,136,113 B2 | 11/2006 | Lee | |
| 7,242,424 B2 | 7/2007 | Lee | |
| 7,289,583 B2 | 10/2007 | He | |
| 7,324,583 B2 | 1/2008 | Hooli et al. | |
| 7,359,466 B2 | 4/2008 | Huang et al. | |
| 7,450,635 B2 | 11/2008 | Zeng et al. | |
| 7,453,946 B2 | 11/2008 | Sondur | |
| 7,466,750 B2 | 12/2008 | Kim et al. | |
| 2010/0136926 A1 * | 6/2010 | Lackey .......... | 455/78 |

* cited by examiner

*Primary Examiner* — Lee Nguyen
(74) *Attorney, Agent, or Firm* — Hamre, Schumann, Mueller & Larson, P.C.

(57) ABSTRACT

An apparatus and method for signal optimization is disclosed. This disclosure relates to improved device and method for improving performance and reducing cosite interference for an antenna array. More particularly, this description relates to a device and method for equalizing signals for communication receivers, and more particularly, to a device and method for matrixed adaptive equalizing configured to a plurality of antennas for receiving one or more signals each designated for one of a plurality of receivers.

20 Claims, 3 Drawing Sheets

DEVICE AND METHOD FOR MATRIXED ADAPTIVE EQUALIZING FOR COMMUNICATION RECEIVERS CONFIGURED TO AN ANTENNA ARRAY

FIELD

This description relates generally to equalizing signals for communication receivers, and more particularly, to a device and method for matrixed adaptive equalizing for communication receivers configured to an antenna array.

BACKGROUND

Operational requirements for increased communication needs are currently met by adding "stovepipe" circuits. To increase bandwidth for increasing communication needs are generally met by merely adding independent apertures, each aperture including an antenna configured to one receiver. One aperture works independently from another. Accordingly, with the increase in the number of these independent apertures, each aperture transmitting and receiving signals independently, cosite interference from one or more aperture to another is increased. The cosite interference is further aggravated where the physical proximities of the independent antennas are close together. Accordingly, device and method for improving performance and reducing cosite interference are desirable.

BRIEF SUMMARY

This description relates to a device and method for signal optimization. The description relates to a device and method for improving performance and reducing cosite interference for an antenna array. This description relates to a device and method for equalizing signals for communication receivers. The description relates to a device and method for matrixed adaptive equalizing configured to a plurality of antennas for receiving one or more signals each designated for one of a plurality of receivers.

In one embodiment, a method for reducing cosite interference is provided. The embodied method for reducing cosite interference comprises receiving a first transmitted signal via a plurality of receiving antennas, the first transmitted signal includes a first training sequence. The embodied method includes a plurality of received signals, wherein each received signal includes the first transmitted signal, and a cosite interference signal, the cosite interference signal includes a cosite training sequence. The embodied method includes directing the plurality of received signals to a processing device. The embodied method includes directing a cosite sample signal to the processing device, the cosite sample signal includes the cosite training sequence. The embodied method includes, for each receiving antenna that receives the received signal, processing the cosite interference signal using the cosite sample signal to produce a cosite equalized signal, and processing the received signal to produce an equalized signal. The embodied method includes phase aligning the equalized signals to produce a plurality of aligned signals. The embodied method includes phase aligning the cosite equalized signals to produce a plurality of cosite aligned signals. The embodied method includes directing the plurality of aligned signals and the plurality of cosite aligned signals to a combiner. The embodied method includes summing the plurality of aligned signals based on the first training sequence and the plurality of cosite aligned signals based on the cosite training sequence to produce a first processed signal. The embodied method includes directing the first processed signal to one of a plurality of receivers based on the first training sequence.

In another embodied method, the processing of the cosite interference signal using the cosite sample signal to produce the cosite equalized signal includes determining a channel distortion from comparing the cosite training sequence of the cosite sample signal and the cosite training sequence of the cosite interference signal.

In another embodied method, the processing of the received signal to produce the equalized signal includes using the channel distortion.

In another embodied method, the cosite interference signal includes an analog cosite data. In the embodied method, the first transmitted signal includes an analog first data. In the embodied method, for each receiving antenna that receives the received signal, prior to the processing the received signal and prior to the processing the cosite interference signal, there is digital conversion of the received signal to digital and digital conversion of the cosite sample signal to digital.

Another embodied method comprises an analog conversion of the first processed signal to analog prior to the directing of the first processed signal to one of the plurality of receivers, so that the first processed signal that is directed to one of the plurality of receivers is analog.

Another embodied method comprises the summing of the plurality of aligned signals based on the first training sequence and the plurality of cosite aligned signals based on the cosite training sequence to produce the first processed signal, to includes weighing each aligned signal with a weight factor, and weighing each cosite aligned signal with a cosite weight factor.

In an embodied method, the cosite weight factor is negative.

Another embodied method includes directing the cosite training sequence from the combiner to a transmitter for embedding the cosite training sequence to a payload signal to produce a cosite signal, wherein a sample of the cosite signal is the cosite sample signal. In this embodied method, the cosite signal is the cosite interference signal when transmitted via an antenna.

Another embodied method includes transmitting the cosite interference signal via a cosite transmitting antenna.

Another embodied method further comprises receiving a second transmitted signal via the plurality of receiving antennas, the second transmitted signal includes a second training sequence. In the embodied method, each of the plurality of received signals further includes the second transmitted signal. The embodied method includes summing the plurality of aligned signals based on the second training sequence and the plurality of cosite aligned signals based on the cosite training sequence to produce a second processed signal, and then directing the second processed signal to one of the plurality of receivers based on the second training sequence.

Another embodied method further includes detecting and identifying the first training sequence, then channel separation of the first transmitted signal from rest of the received signal by using the first training sequence. The embodied method includes detecting and identifying the second training sequence, then channel separation of the second transmitted signal from rest of the received signal by using the second training sequence.

Another embodied method includes an analog conversion of the second processed signal to analog prior to the directing of the second processed signal to one of the plurality of receivers, so that the second processed signal that is directed to one of the plurality of receivers is analog.

In another embodiment, a communication device that reduces cosite interference is provided. A communication device according to an embodiment comprises a plurality of antennas configured to receive signals and direct the signals received to a processing device.

The embodiment includes the processing device connected to the plurality of antennas, and receives the signals from the plurality of antennas, a transmitter connected to the processing device, wherein the transmitter sends and the processing device receives a cosite sample signal, wherein the cosite sample signal includes a cosite training sequence, and a plurality of receivers connected to the processing device. In the embodiment, the processing device processes the signal to reduce cosite interference using the cosite sample signal and the cosite training sequence to produce a processed signal, the processing device directs the processed signal to one of the plurality of receivers based on the training sequence of the signal, and the one of the plurality of receivers that receives the processed signal.

In an embodiment, the processing device includes a channel separator that separates at least one signal to different channels based on the training sequence to produce at least one channel separated signal and a cosite interference signal based on the cosite training sequence, and directs the channel separated signal and the cosite interference signal to a matrix adaptive equalizer. The embodiment includes the matrix adaptive equalizer that receives the channel separated signal, the cosite interference signal, and the cosite sample signal, that correlates the cosite training sequence of the cosite interference signal and the cosite training sequence of the cosite sample signal to determine a channel distortion, that processes the channel separated signal to reduce channel distortion, that phase aligns the channel separated signal and the cosite interference signal with respect to each other to produce a processed channel separated signal, and that directs the processed channel separated signal to a combiner.

In an embodiment, the combiner receives the processed channel separated signal, sums the processed channel separated signal and the cosite sample signal to produce the processed signal, and directs the processed signal to one of the receivers based on the training sequence of the signal.

In an embodiment, the combiner converts the processed signal to analog prior to directing the processed signal to one of the receivers. Wherein the receiver that receives the analog processed signal is configured to receive analog signals.

In an embodiment, the processing device includes more than one of the matrix adaptive equalizers. The embodiment includes the combiner that receives plurality of the processed channel separated signals, that sums the processed channel separated signals to produce the processed signal, and directs the processed signal to one of the receivers based on the training sequence of the signal. The embodiment includes a plurality of analog to digital converters that converts signals to digital, each analog to digital converter connected between one of the antennas and one of the matrix adaptive equalizers.

In an embodiment, the processing device separates at least one signal to different channels based on the training sequence to produce at least one channel separated signal and a cosite interference signal based on the cosite training sequence, correlates the cosite training sequence of the cosite interference signal and the cosite training sequence of the cosite sample signal to determine a channel distortion, processes the channel separated signal to reduce channel distortion, phase aligns the channel separated signal and the cosite interference signal with respect to each other to produce a processed channel separated signal, sums the processed channel separated signal and the cosite sample signal to produce the processed signal, and directs the processed signal to one of the receivers based on the training sequence of the signal.

In an embodiment, the transmitter is connected to at least one of the plurality of antennas. The transmit/receive switch is connected to the transmitter. The transmit/receive switch is connected to the antenna that is connected to the transmitter. The transmit/receive switch is configured to include a transmit state and a receive state, wherein when the transmit/receive switch is in the transmit state, the antenna connected to the transmitter is configured to transmit the cosite signal, and wherein when the transmit/receive switch is in the receive state, the antenna connected to the transmitter is configured to receive signals. Any number of the plurality of antennas may be configured with a transmit/receive switch accordingly to above.

DETAILED DESCRIPTION

The term "processed" when used describing a signal or as applied to a signal, is defined as affecting the signal via a hardware, a software, or a combination of a hardware and a software, so that the signal has been altered in frequency, phase, or in another way. For example, when a signal has been affected via a hardware and a software so that the signal's signal-to-noise ratio has been enhanced, that signal has been processed, according to the definition herein. The term "connected" or "connection" is defined herein to include configuration to be in communication with, for example, via a cable, optical fiber, wifi, radio, digital, analog, a combination thereof, including other equivalent devices and methods that would be appreciated by those skilled in the art. The term "sample" when used describing a signal or as applied to a signal, means a copy of the signal, in its entirety or a portion thereof. Generally, a sample of an original signal is substantially the same as the original. It will be understood that when a sample is taken from the original signal, the power of the original signal may be reduced. It will be understood that when a sample is taken from the original signal, the sample's power may be lower than that of the original signal prior to the sampling. It will also be understood that when a sample is taken from the original signal, for example when optical fiber and optical signals are being used, there may be no loss of power when the sample is compared to the original before and/or after the sampling.

Figure 1:
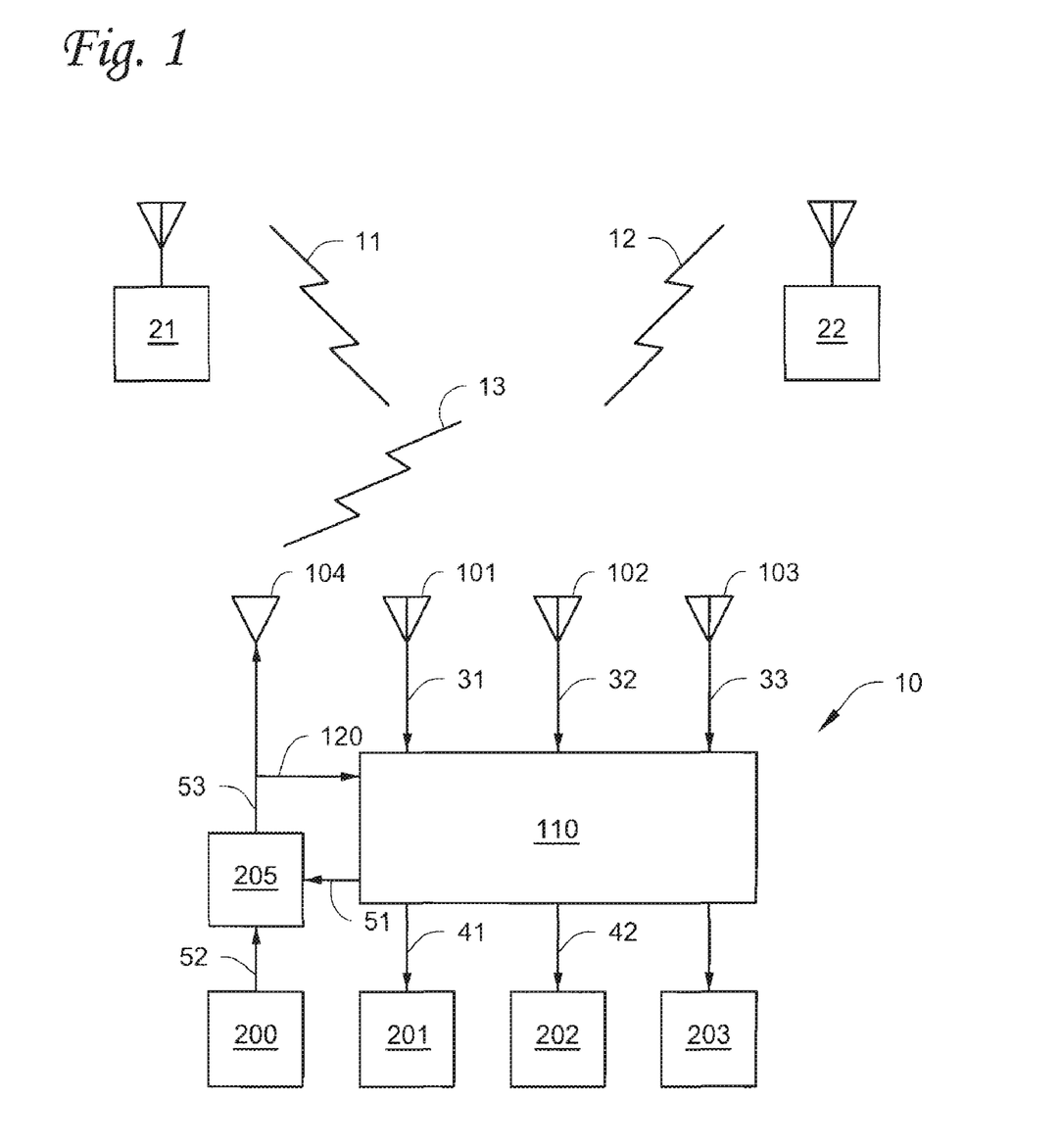
FIG. 1 shows a block diagram of an embodiment.

FIG. 1 shows an embodiment of the communication device that reduces cosite interference. The embodied method will be understood in the description of FIG. 1. FIG. 1 show a communication device 10 that includes a plurality of antennas 101, 102, 103 configured to receive signals and direct the signals received to a processing device 110. Although three antennas 101, 102, 103 are shown in FIG. 1, it will be understood that any number of antennas may be included. Example of signals that are received by the plurality of antennas 101, 102, 103 are a first transmitted signal 11 transmitted from a distant transmitter 21, and a second transmitted signal 12 transmitted from a distant transmitter 22. The communication device 10 includes a transmitter 200 that is connected to a transmitting antenna 104 configured to transmit signals 13.

The transmitting antenna 104 may also be called a cosite transmitting antenna 104 due to its proximity to the plurality of antennas 101, 102, 103. Furthermore, the transmitting antenna 104 may also be called the cosite transmitting antenna 104 due to its connection to the processing device 110, which is also connected to the plurality of antennas 101, 102, 103. Thus, either the proximity and/or the shared feature of being connected to the same processing device 110 makes the transmitting antenna 104 a cosite transmitting antenna 104. Accordingly, signals transmitted via the cosite transmitting antenna 104 may be called a cosite signal 13. The transmitter 200 send and the processing device 110 receives a cosite sample signal 120, wherein the cosite sample signal 120 includes a cosite training sequence. Accordingly, the cosite sample signal 120 may be digital, analog, or a combination of digital and analog. For example, the cosite sample signal 120 may have a digital portion that includes the cosite training sequence, and an analog portion that includes data in analog form, wherein the analog portion is normal to the digital portion. The processing device 110 may be configured to receive a hybrid digital/analog cosite sample signal 120 and use the cosite training sequence to identify the cosite sample signal 120 as the cosite sample signal 120 and use the data in processing other signals, which will be explained further in detail below.

When the cosite signal 13 is transmitted from the cosite transmitting antenna 104, the plurality of antennas 101, 102, 103 receive the cosite signal 13 as a cosite interference signal 13. Generally, the cosite signal 13 is being transmitted for a distant receiver to receive and not for the plurality of antennas 101, 102, 103 to receive. Further, generally, the plurality of antennas 101, 102, 103 will receive, for example, signals 11, 12 from a distant transmitter 21, 22. Thus, when the plurality of antennas 101, 102, 103 receive the signals 11, 12, 13, the cosite signal 13 is received as a particularly loud noise over the other signals 11, 12. Thus, the cosite interference signal 13 may substantially reduce the signal-to-noise ratio of signals 11, 12 received by the plurality of antennas 101, 102, 103.

Accordingly, as shown in FIG. 1, antenna 101 receives the first transmitted signal 11 and cosite interference signal 13 and directs the received signal 31 to the processing device 110. The first transmitted signal 11 includes a first training sequence. Further, if antenna 101 also receives another signal, the second transmitted signal 12, then the received signal 31 includes the first transmitted signal 11, the second transmitted signal 12, and the cosite interference signal 13. The second transmitted signal 12 includes a second training sequence. The antenna 101 directs the received signal 31 to the processing device 110.

As shown in FIG. 1, antenna 102 receives the first transmitted signal 11 and cosite interference signal 13 and directs the received signal 32 to the processing device 110. Further, if antenna 102 also receives another signal, the second transmitted signal 12, then the received signal 32 includes the first transmitted signal 11, the second transmitted signal 12, and the cosite interference signal 13. The antenna 102 directs the received signal 32 to the processing device 110.

As shown in FIG. 1, antenna 103 receives the first transmitted signal 11 and cosite interference signal 13 and directs the received signal 33 to the processing device 110. Further, if antenna 103 also receives another signal, the second transmitted signal 12, then the received signal 33 includes the first transmitted signal 11, the second transmitted signal 12, and the cosite interference signal 13. The antenna 103 directs the received signal 33 to the processing device 110.

The first transmitted signal 11 may be digital, analog, or a combination of digital and analog. For example, the first transmitted signal 11 may have a digital portion that includes the first training sequence, and an analog portion that includes data in analog form wherein the analog portion is normal to the digital portion.

The second transmitted signal 12 may be digital, analog, or a combination of digital and analog. For example, the second transmitted signal 12 may have a digital portion that includes the second training sequence, and an analog portion that includes data in analog form wherein the analog portion is normal to the digital portion.

The processing device may be configured to receive one or more hybrid digital/analog received signals 31, 32, 33. The processing device 110 reduces this cosite interference signal 13 from the received signals 31, 32, 33 and directs the first processed signal 41 to its destined receiver based on the training sequence. The processing device 110 is connected to a plurality of receivers 201, 202, 203. Although three receivers 201, 202, 203 are shown in FIG. 1, it will be understood that any number of receivers may be included. Accordingly, the same set of the plurality of antennas 101, 102, 103 are connected to each of the plurality of receivers 201, 202, 203 through the processing device 110. Because the processing device 110 processes the signals received via the plurality of antennas 101, 102, 103 and directs the received signals to their destined receiver, which is one of the plurality of receivers 201, 202, 203, an advantageous ratio of number of antennas to number of receivers may be achieved.

The processing device 110 processes the received signals 31, 32, 33 to reduce cosite interference 13 using the cosite sample signal 120 and the cosite training sequence to produce a processed signal 41, 42. Thusly, each processed signal 41, 42 has an enhanced signal-to-noise ratio as compared to the received signals 31, 32, 33 because the cosite interference has been reduced. Further, each processed signal 41, 42 may also have an enhanced signal-to-noise ratio as compared to the received signals 31, 32, 33 because each processed signal 41, 42 are a sum of particular signals, for example, the processed signal 41 is shown to be a sum of first transmitted signal 11 from the received signals 31, 32, 33 via the plurality of antennas 101, 102, 103. Thus, the processing device 110 separates at least one received signal to different channels based on the training sequence of the received signal and produces at least one channel separated signal and a cosite interference signal based on the cosite training sequence. Then the processing device correlates the cosite training sequence of the cosite interference signal 13 and the cosite training sequence of the cosite sample signal 120 to determine a channel distortion. Then, the processing device processes the channel separated signal to reduce channel distortion, phase aligns the channel separated signal and the cosite interference signal with respect to each other to produce a processed channel separated signal, sums the processed channel separated signal and the cosite sample signal to produce the processed signal 41, 42, and directs the processed signal 41, 42 to one of the receivers 201, 202 based on the training sequence of the signal.

The receivers 201, 202 receive the processed signals 41, 42. For example, as shown in FIG. 1, if the first processed signal 41 is a processed and equalized version of the first transmitted signal 11, and the first training sequence on the first transmitted signal 11 indicates that the first transmitted signal 11 is for receiving by receiver 201, then the processing device 110 directs the first processed signal 41 to and is received by the receiver 201. For another example, as shown in FIG. 1, if the second processed signal 42 is a processed and equalized version of the second transmitted signal 12, and the second training sequence on the second transmitted signal 12 indicates that the second transmitted signal 12 is for receiving by receiver 202, then the processing device 110 directs the second processed signal 42 to and is received by the receiver 202.

FIG. 1 also shows a feedback loop 51 of the cosite training sequence to adjust a payload signal 52 from the transmitter. The processing device 110 directs the cosite training sequence from the processing device 110 towards the transmitter 200 for embedding the cosite training sequence to the payload signal 52 to produce a cosite signal 53, the cosite signal 53 prior to being transmitted via the antenna 104, wherein once transmitted, the cosite signal 53 is the cosite interference signal 13 when received by the cosite receiving antennas 101, 102, 103. The payload signal 52 may be analog or digital. The cosite training sequence is embedded to the payload signal 52 to produce the cosite signal 53. The cosite signal 53 may be digital or a combination of digital and analog, wherein the analog portion includes the analog cosite data from the payload signal 52. The cosite training sequence being embedded normal to the analog portion. The embedding may be performed with an embedding device 205 as shown in FIG. 1. Alternatively, the embedding may be performed via software 205, or a combination of hardware and software 205. A sample of the cosite signal 53 is the cosite sample signal 120, and wherein the cosite signal 53 is the cosite interference signal 13 when transmitted via the antenna 104.

Figure 2:
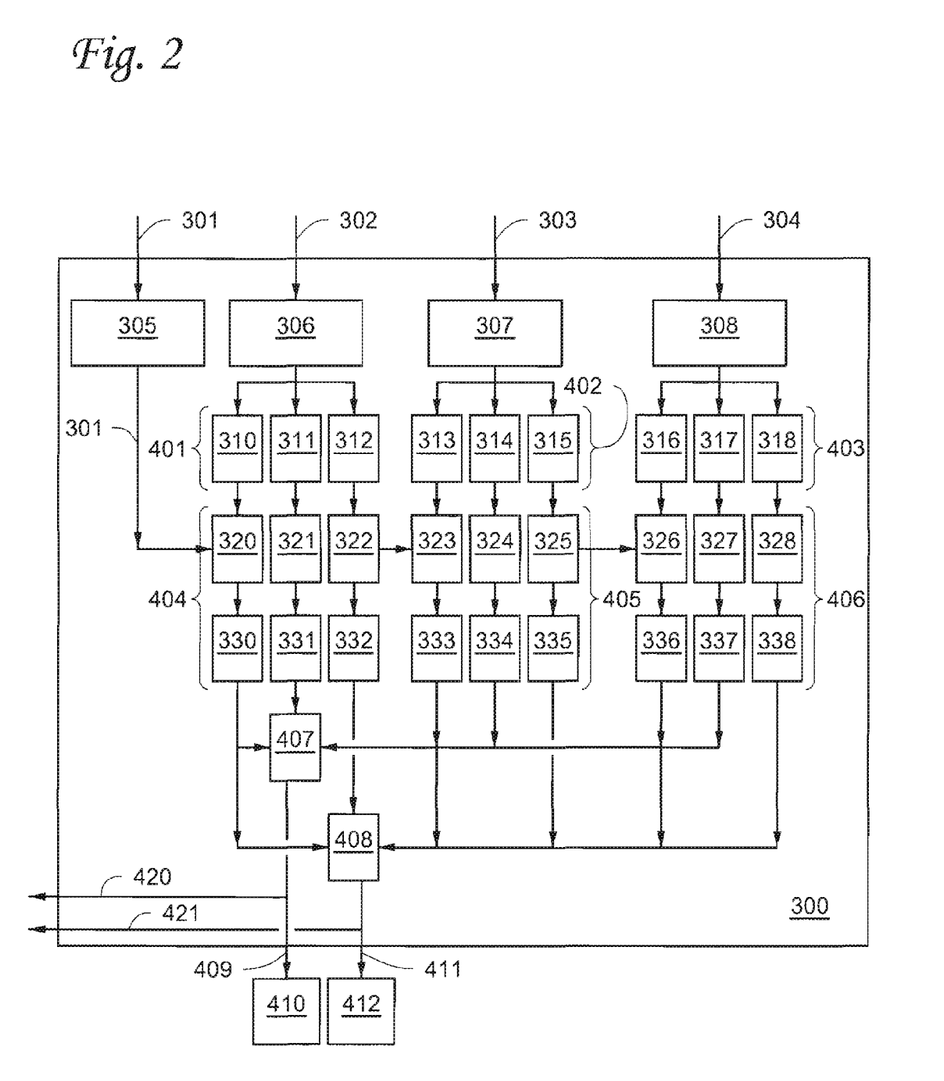
FIG. 2 shows a block diagram of an embodiment of a processing device.

FIG. 2 shows an embodiment of a processing device 300. The processing device 300 shown in FIG. 2 may replace or be included in the communication devices 110, 505 shown in FIG. 1 and/or FIG. 3.

The processing device 300 equalizes received signals 302, 303, 304 and processes the received signals 302, 303, 304 to reduce cosite interference. Each received signal 302, 303, 304 has its unique channel distortions and time/phase delay due to various reasons, for example, different types of hardware, different lengths of cables, different quality in shielding, etc. One skilled in the art will understand that these factors and many others can cause different channel distortions for each signal pipeline. Thus, each signal pipeline may have its own unique channel distortion. For an array or matrixed systems, to resolve these unique channel distortions, there is a hardware solution wherein all the hardware are designed to reduce the uniqueness of the channel distortions. An example of one hardware solution is using matched cables. The processing device 300 shown in FIG. 2 does not require this kind of a hardware solution. The processing device 300 processes the received signals 302, 303, 304 to correct for each of their unique channel distortion.

The processing device 300 applies the cosite sample signal 301 directly to equalize the received signals 302, 303, 304. The cosite sample signal 301 includes a cosite training sequence. Accordingly, the cosite sample signal 301 may be digital, analog, or a combination of digital and analog. For example, the cosite sample signal 301 may have a digital portion that includes the cosite training sequence, and an analog portion that includes data in analog form, wherein the analog portion is normal to the digital portion. The processing device 300 may be configured to receive a hybrid digital/analog cosite sample signal 301, for example, an analog to digital converter 305 is included in the processing device 300 in FIG. 2. However, it will be understood where the processing device is configured for digital cosite sample signal 301 only, then the analog to digital converter 305 is not required to be included in the processing device 300. Accordingly, a separate figure is not needed for one skilled in the art to understand such an embodiment.

FIG. 2 is shown with a plurality of analog to digital converters 306, 307, 308 that receive the received signals 302, 303, 304. This is because the embodiment of the processing device 300 shown in FIG. 2 is for when the received signals 302, 303, 304 are a combination analog/digital hybrid signals. However, a digital version of the processing device 300 configured to receive digital receiving signals 302, 303, 304 may be substantially be the same as that shown in FIG. 2, absent the analog to digital converters 302, 303, 304. Accordingly, a separate figure is not needed for one skilled in the art to understand such an embodiment.

Each received signal 302, 303, 304 includes a first transmitted signal, a second transmitted signal, and a cosite interference signal. It will be understood that a plurality of transmitted signals and cosite interference signals are possible. The first transmitted signal has an embedded first training sequence. The second transmitted signal has an embedded second training sequence. The cosite interference signal has an embedded cosite training sequence.

The processing device includes channel separators 401, 402, 403 that separates the received signals 302, 303, 304 based on the detected training sequences embedded on the received signals 302, 303, 304 so that the first transmitted signal 310, 313, 316, the second transmitted signal 312, 315, 318, and the cosite interference signal 311, 314, 317 are channel separated for individual processing. Only three channels are shown in FIG. 2, but it will be understood that many more channels are possible and envisioned. FIG. 2 shows the received signal 302 being processed by the channel separator 401 so that the first transmitted signal 310 the second transmitted signal 312 and the cosite interference signal 311 are channel separated for individual processing. FIG. 2 shows the received signal 303 being processed by the channel separator 402 so that the first transmitted signal 313 the second transmitted signal 315 and the cosite interference signal 314 are channel separated for individual processing. FIG. 2 shows the received signal 304 being processed by the channel separator 403 so that the first transmitted signal 316 the second transmitted signal 318 and the cosite interference signal 317 are channel separated for individual processing. Each channel separated signals 310, 311, 312, 313, 314, 315, 316, 317, 318 are directed to a matrix adaptive equalizer 404, 405, 406.

FIG. 2 shows three matrixed adaptive equalizers 404, 405, 406, that processes channel separated signals 310, 311, 312, 313, 314, 315, 316, 317, 318. Only three channels are shown for each matrixed adaptive equalizer 404, 405, 406 in FIG. 2, but it will be understood that many more channels for each matrixed adaptive equalizer 404, 405, 406 are possible and envisioned.

The matrix adaptive equalizers 404, 405, 406 receives the channel separated signals 310, 311, 312, 313, 314, 315, 316, 317, 318 and the cosite sample signal 301 and correlates the cosite training sequence of the cosite interference signal 311, 314, 317 and the cosite training sequence of the cosite sample signal 301 to determine a channel distortion. The matrix adaptive equalizer then processes the other channel separated signals 310, 312, 313, 315, 316, 318 to reduce channel distortion on those signals to produce equalized signals. Then, the matrix adaptive equalizers 404, 405, 406 phase aligns all of the channel separated signals or now equalized signals 310, 311, 312, 313, 314, 315, 316, 317, 318 with respect to each other to produce processed channel separated signals or aligned signals 320, 321, 322, 323, 324, 325, 326, 327, 328 and then directs the aligned signals 320, 321, 322, 323, 324, 325, 326, 327, 328 towards the combiners 407, 408.

In one embodiment, as shown in FIG. 2, the aligned signals 320, 321, 322, 323, 324, 325, 326, 327, 328 are each weighed with an individual weight factor to produce weighed aligned signals 330, 331, 332, 333, 334, 335, 336, 337, 338 and then the weighed aligned signals are directed towards the combiners 407, 408. The weight factor applied to the signals 321, 324, 327 that are the processed versions of the cosite interference signals may be negative.

For example, producing a processed channel separated signal 320, 321, 322, 323, 324, 325, 326, 327, 328 may include equalization of the signals wherein the equalization is performed by detecting the unique channel distortion for each received signals 302, 303, 304, wherein a non-square Hermitian Matrices are derived on the training sequences and then applied to the inverse of the signals.

For example, producing a processed channel separated signal 320, 321, 322, 323, 324, 325, 326, 327, 328 may include correlating the cosite training sequence of the cosite interference signal and the cosite training sequence of the cosite sample signal 301 to determine the unique channel distortion for each received signals 302, 303, 304.

The combiners 407, 408 receive certain processed channel separated signals or aligned signals 320, 321, 322, 323, 324, 325, 326, 327, 328, and sums received signals to produce the processed signals 409, 411. The combiners 407, 408 then directs each processed signal 409, 411 to one of the receivers 410, 412 based on the training sequence of the processed signal 409, 411.

As shown in FIG. 2, weighed aligned signals 330, 331, 332, 333, 334, 335, 336, 337, 338 are directed to the combiners 407, 408. The weighed aligned signals 330, 333, 336 being the processed channel separated signals of the first transmitted signal received from the received signals 302, 303, 304 are sent to the combiner 407. The weighed aligned signals 331, 334, 337 being the processed channel separated signals of the cosite interference signal received from the received signals 302, 303, 304 are sent to the combiner 407.

The combiner sums the weighed aligned signals and produces the processed signal 409 and directs the processed signal 409 to the receiver 410 based on the training sequence embedded on the signals 310, 313, 316.

Also as shown in FIG. 2, weighed aligned signals 330, 331, 332, 333, 334, 335, 336, 337, 338 are directed to the combiners 407, 408. The weighed aligned signals 330, 333, 336 being the processed channel separated signals of the first transmitted signal received from the received signals 302, 303, 304 are sent to the combiner 407. The combiner sums the weighed aligned signals and produces the processed signal 409 and directs the processed signal 409 to the receiver 410 based on the training sequence embedded on the signals 310, 313, 316.

Although not shown in FIG. 2, for the case wherein the receivers are configured to receive analog signals only, one or more of the combiners 407, 408 may be configured to convert one or more of the processed signal 409, 411 to analog prior to directing the processed signal 409, 411 to one of the analog receivers. Alternately, the processed signal 409, 411 may be sent to a digital to analog converter (not shown) prior to being directed to an analog receiver.

From the processed signal 409, 411 a feedback loop 420, 421 may be directed towards the transmitter by sampling the cosite training sequence. The feedback loop 420, 421 may be directed from the combiner to the transmitter for embedding the cosite training sequence to a payload signal to produce a cosite signal, wherein a sample of the cosite signal is the cosite sample signal, and wherein the cosite signal is the cosite interference signal when transmitted via an antenna.

Figure 3:
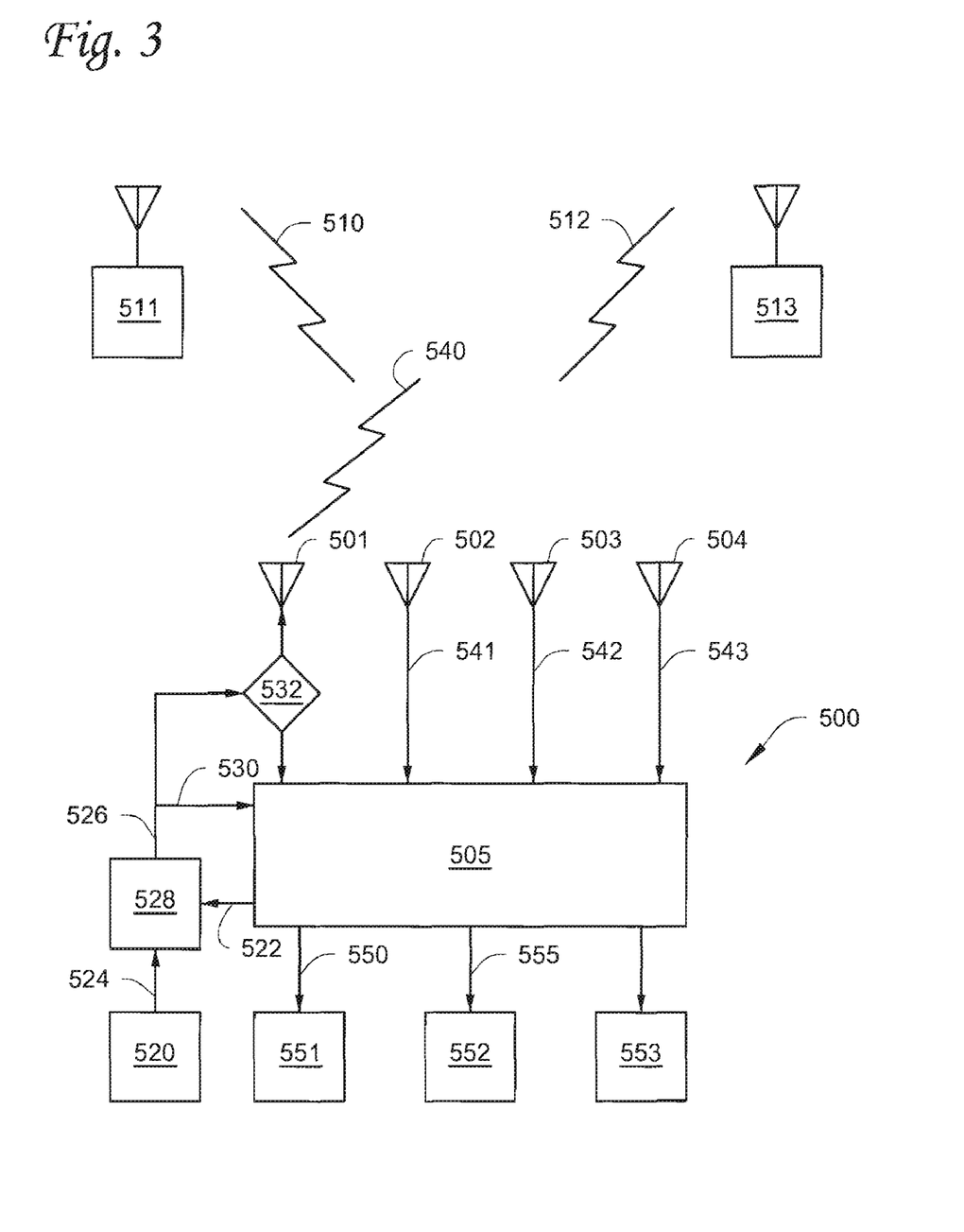
FIG. 3 shows a block diagram of an embodiment.

FIG. 3 shows another embodiment of the communication device that reduces cosite interference, similar to the embodiment shown in FIG. 1. The embodied method will also be understood in the description of FIG. 3. FIG. 3 show a communication device 500 that includes a plurality of antennas 501, 502, 503, 504 configured to receive signals and direct the signals received to a processing device 505. Although four antennas 501, 502, 503, 504 are shown in FIG. 3, it will be understood that any number of antennas may be included. Example of signals that are received by the plurality of antennas 501, 502, 503, 504 are a first transmitted signal 510 transmitted from a distant transmitter 511, and a second transmitted signal 512 transmitted from a distant transmitter 513. The communication device 500 includes a transmitter 520 that is connected to one of the plurality of antennas 501.

FIG. 3 shows a feedback loop 522 of the cosite training sequence directed from the processing device 505 to adjust a payload signal 524 from the transmitter. The processing device 505 directs the cosite training sequence from the processing device 505 towards the transmitter 520 for embedding the cosite training sequence to the payload signal 524 to produce a cosite signal 526. The payload signal 524 may be analog or digital. The cosite training sequence is embedded to the payload signal 524 to produce the cosite signal 526. The cosite signal 526 may be digital or a combination of digital and analog, wherein the analog portion includes the analog cosite data from the payload signal 524. The cosite training sequence being embedded normal to the analog portion. The embedding may be performed with an embedding device 528 as shown in FIG. 3. Alternatively, the embedding may be performed via software 528, or a combination of hardware and software 528. A sample of the cosite signal 526 is the cosite sample signal 530 that is directed to the processing device 505. The cosite signal 526 is directed towards the antenna 501.

FIG. 3 shows a transmit/receive switch 532 connected to the transmitter 520. FIG. 3 shows the transmit/receive switch 532 the antenna 501 that is also connected to the transmitter 520. The transmit/receive switch 532 is configured to include a transmit state and a receive state, wherein when the transmit/receive switch is in the transmit state, the antenna 501 connected to the transmitter is configured to transmit the cosite signal 526, and wherein when the transmit/receive switch is in the receive state, the antenna 501 connected to the transmitter is configured to receive signals. It will be understood that any of the other antennas 502, 503, 504 may also be provided with a transmit/receive switch and be connected to the transmitter 520 (configuration not shown). When the transmit/receive switch 532 is in the transmit state, the cosite signal 525 may be transmitted via the antenna 501 as a cosite interference signal 540 which is received by the cosite receiving antennas 502, 503, 504. The cosite signal 525 is prior to being transmitted via the antenna 501, wherein once transmitted, the cosite signal 525 is the cosite interference signal 540

FIG. 3 shows the antenna 502 receiving the first transmitted signal 510 and cosite interference signal 540 and directs the received signal 541 to the processing device 505. The first transmitted signal 510 includes a first training sequence. Further, if antenna 502 also receives another signal, the second transmitted signal 512, then the received signal 541 includes the first transmitted signal 510, the second transmitted signal 512, and the cosite interference signal 540. The second transmitted signal 512 includes a second training sequence. The received signal 541 from the antenna 502 is directed to the processing device 505.

Also shown in FIG. 3, antenna 503 receives the first transmitted signal 510 and cosite interference signal 540 and directs the received signal 542 to the processing device 505.

Further, if antenna 503 also receives another signal, the second transmitted signal 512, then the received signal 542 includes the first transmitted signal 510, the second transmitted signal 512, and the cosite interference signal 540. The received signal 542 from the antenna 503 is directed to the processing device 110.

Also shown in FIG. 3, there is an antenna 504 that receives the first transmitted signal 510 and cosite interference signal 540 and directs the received signal 543 to the processing device 505. Further, if antenna 504 also receives another signal, the second transmitted signal 512, then the received signal 543 includes the first transmitted signal 510, the second transmitted signal 512, and the cosite interference signal 540. The received signal 543 from the antenna 504 is directed to the processing device 110.

The first transmitted signal 510 may be digital, analog, or a combination of digital and analog. For example, the first transmitted signal 510 may have a digital portion that includes the first training sequence, and an analog portion that includes data in analog form wherein the analog portion is normal to the digital portion.

The second transmitted signal 512 may be digital, analog, or a combination of digital and analog. For example, the second transmitted signal 512 may have a digital portion that includes the second training sequence, and an analog portion that includes data in analog form wherein the analog portion is normal to the digital portion.

The processing device 505 may be configured to receive one or more hybrid digital/analog received signals 541, 542, 543. The processing device 505 reduces this cosite interference signal 540 from the received signals 541, 542, 543 and directs the first processed signal 550 to its destined receiver 551 based on the training sequence. The processing device 505 is connected to a plurality of receivers 551, 552, 553. Although only three receivers 551, 552, 553 are shown in FIG. 3, it will be understood that any number of receivers may be included. Accordingly, the same set of the plurality of antennas 501, 502, 503, 504 are connected to each of the plurality of receivers 551, 552, 553 through the processing device 505. Because the processing device 505 processes the signals received via the plurality of antennas 501, 502, 503, 504 and directs the received signals to their destined receiver, which is one of the plurality of receivers 551, 552, 553.

The processing device 505 processes the received signals 541, 542, 543 to reduce cosite interference using the cosite sample signal 530 and the cosite training sequence to produce a processed signal 550, 555. Thusly, each processed signal 550, 555 has an enhanced signal-to-noise ratio as compared to the received signals 541, 542, 543 because, for example, the cosite interference has been reduced. The processing device directs the processed signal 550, 555 to one of the plurality of receivers 551, 552 based on the training sequence of the signal.

Further, each processed signal 550, 555 may also have an enhanced signal-to-noise ratio as compared to the received signals 541, 542, 543 because each processed signal 550, 555 are a sum of particular signals, for example, the processed signal 550 is shown in FIG. 3 to be a sum of first transmitted signal 510 from the received signals 541, 542, 543 via the plurality of antennas 502, 503, 504. The processing device 505 separates at least one received signal to different channels based on the training sequence of the received signal and produces at least one channel separated signal and a cosite interference signal based on the cosite training sequence. Then the processing device correlates the cosite training sequence of the cosite interference signal 540 and the cosite training sequence of the cosite sample signal 530 to determine a channel distortion. Then, the processing device processes the channel separated signal to reduce channel distortion, phase aligns the channel separated signal and the cosite interference signal with respect to each other to produce a processed channel separated signal, sums the processed channel separated signals to produce the processed signal 550, 555 and directs the processed signal 550, 555 to one of the receivers 551, 552 based on the training sequence of the signal.

The receivers 551, 552 receive the processed signals 550, 555. For example, as shown in FIG. 3, if the first processed signal 550 is a processed and equalized version of the first transmitted signal 510, and the first training sequence on the first transmitted signal 510 indicates that the first transmitted signal 510 is for receiving by receiver 551, then the processing device 505 directs the first processed signal 550 to and is received by the receiver 551. For another example, as shown in FIG. 3, if the second processed signal 555 is a processed and equalized version of the second transmitted signal 512, and the second training sequence on the second transmitted signal 512 indicates that the second transmitted signal 512 is for receiving by receiver 552, then the processing device 505 directs the second processed signal 555 to and is received by the receiver 552.

Preferred embodiments have been described. Those skilled in the art will appreciate that various modifications and substitutions are possible, without departing from the scope of the invention as claimed and disclosed, including the full scope of equivalents thereof.

What is claimed is:

1. A method for reducing cosite interference, comprising:
receiving a first transmitted signal via a plurality of receiving antennas, the first transmitted signal includes a first training sequence;
a plurality of received signals, each received signal including the first transmitted signal, and a cosite interference signal, the cosite interference signal includes a cosite training sequence;
directing the plurality of received signals to a processing device;
directing a cosite sample signal to the processing device, the cosite sample signal includes the cosite training sequence;
for each receiving antenna that receives the received signal:
processing the cosite interference signal using the cosite sample signal to produce a cosite equalized signal, and
processing the received signal to produce an equalized signal;
phase aligning the equalized signals to produce a plurality of aligned signals;
phase aligning the cosite equalized signals to produce a plurality of cosite aligned signals;
directing the plurality of aligned signals and the plurality of cosite aligned signals to a combiner;
summing the plurality of aligned signals based on the first training sequence and the plurality of cosite aligned signals based on the cosite training sequence to produce a first processed signal; and
directing the first processed signal to one of a plurality of receivers based on the first training sequence.

2. The method according to claim 1, wherein:
the processing of the cosite interference signal using the cosite sample signal to produce the cosite equalized signal includes:

determining a channel distortion from comparing the cosite training sequence of the cosite sample signal and the cosite training sequence of the cosite interference signal.

3. The method according to claim 2, wherein:
the processing the received signal to produce the equalized signal includes:
using the channel distortion.

4. The method according to claim 1, wherein:
the cosite interference signal includes an analog cosite data;
the first transmitted signal includes an analog first data; and
for each receiving antenna that receives the received signal, prior to the processing the received signal and prior to the processing the cosite interference signal:
digital conversion of the received signal to digital, and
digital conversion of the cosite sample signal to digital.

5. The method according to claim 1, further comprising:
analog conversion of the first processed signal to analog prior to the directing of the first processed signal to one of the plurality of receivers.

6. The method according to claim 1, wherein the summing of the plurality of aligned signals and the plurality of cosite aligned signals, includes:
weighing each aligned signal with a weight factor; and
weighing each cosite aligned signal with a cosite weight factor.

7. The method according to claim 6, wherein the cosite weight factor is negative.

8. The method according to claim 1, further comprising:
directing the cosite training sequence from the combiner to a transmitter for embedding the cosite training sequence to a payload signal to produce a cosite signal, wherein a sample of the cosite signal is the cosite sample signal, and wherein the cosite signal is the cosite interference signal when transmitted via an antenna.

9. The method according to claim 8, further comprising:
transmitting the cosite interference signal via a cosite transmitting antenna.

10. The method according to claim 1, further comprising:
receiving a second transmitted signal via the plurality of receiving antennas, the second transmitted signal includes a second training sequence;
each of the plurality of received signals further includes the second transmitted signal;
summing the plurality of aligned signals based on the second training sequence and the plurality of cosite aligned signals based on the cosite training sequence to produce a second processed signal; and
directing the second processed signal to one of the plurality of receivers based on the second training sequence.

11. The method according to claim 10, further comprising:
detecting and identifying the first training sequence;
channel separation of the first transmitted signal from rest of the received signal by using the first training sequence;
detecting and identifying the second training sequence; and
channel separation of the second transmitted signal from rest of the received signal by using the second training sequence.

12. The method according to claim 10, further comprising:
analog conversion of the second processed signal to analog prior to the directing of the second processed signal to one of the plurality of receivers.

13. A communication device that reduces cosite interference, comprising:

a plurality of antennas configured to receive signals and direct the signals received to a processing device, wherein at least one of the signals includes a training sequence;
the processing device connected to the plurality of antennas, and receives the signals from the plurality of antennas;
a transmitter connected to the processing device,
wherein the transmitter send and the processing device receives a cosite sample signal;
cosite sample signal includes a cosite training sequence;
a plurality of receivers connected to the processing device;
the processing device that processes the signal to reduce cosite interference using the cosite sample signal and the cosite training sequence to produce a processed signal,
the processing device that directs the processed signal to one of the plurality of receivers based on the training sequence of the signal; and
the one of the plurality of receivers that receives the processed signal.

14. The communication device according to claim 13, wherein the processing device includes:
a channel separator that separates at least one signal to different channels based on the training sequence to produce at least one channel separated signal and a cosite interference signal based on the cosite training sequence, and directs the channel separated signal and the cosite interference signal to a matrix adaptive equalizer; and
the matrix adaptive equalizer that receives the channel separated signal, the cosite interference signal, and the cosite sample signal, that correlates the cosite training sequence of the cosite interference signal and the cosite training sequence of the cosite sample signal to determine a channel distortion, that processes the channel separated signal to reduce channel distortion, that phase aligns the channel separated signal and the cosite interference signal with respect to each other to produce a processed channel separated signal, and that directs the processed channel separated signal to a combiner.

15. The communication device according to claim 14, wherein the combiner that receives the processed channel separated signal, that sums the processed channel separated signal and the cosite sample signal to produce the processed signal, and directs the processed signal to one of the receivers based on the training sequence of the signal.

16. The communication device according to claim 15, wherein the combiner that converts the processed signal to analog prior to directing the processed signal to one of the receivers.

17. The communication device according to claim 14, wherein the processing device includes more than one of the matrix adaptive equalizers; wherein the combiner that receives plurality of the processed channel separated signals, that sums the processed channel separated signals to produce the processed signal, and directs the processed signal to one of the receivers based on the training sequence of the signal; and a plurality of analog to digital converters that converts signals to digital, each analog to digital converter connected between one of the antennas and one of the matrix adaptive equalizers.

18. The communication device according to claim 13, the processing device that separates at least one signal to different channels based on the training sequence to produce at least one channel separated signal and a cosite interference signal based on the cosite training sequence, that correlates the cosite training sequence of the cosite interference signal and the cosite training sequence of the cosite sample signal to determine a channel distortion, that processes the channel separated signal to reduce channel distortion, that phase aligns the channel separated signal and the cosite interference signal with respect to each other to produce a processed channel separated signal, that sums the processed channel separated signal and the cosite sample signal to produce the processed signal, and directs the processed signal to one of the receivers based on the training sequence of the signal.

19. The communication device according to claim 13, wherein the transmitter is connected to at least one of the plurality of antennas, wherein the at least one of the antennas is configured to receive from the transmitter a cosite signal and to transmit the cosite signal, wherein the cosite signal is received by at least one of the plurality of antennas as a cosite interference signal.

20. The communication device according to claim 19, further comprising a transmit/receive switch,
   wherein the transmit/receive switch is connected to the transmitter,
   wherein the transmit/receive switch is connected to the antenna that is connected to the transmitter,
   wherein the transmit/receive switch is configured to include a transmit state and a receive state,
   wherein when the transmit/receive switch is in the transmit state, the antenna connected to the transmitter is configured to transmit the cosite signal, and
   wherein when the transmit/receive switch is in the receive state, the antenna connected to the transmitter is configured to receive signals.

* * * * *